US Patent Office 3,155,662 Patented Nov. 3, 1964

3,155,662
3 HALOGENO PYRIDAZINE-6-MERCAPTO-
ALKANOIC ACID AMIDES
Heimo Stormann-Menninger, Linz, Rupert Schönbeck, Leonding, near Linz, and Engelbert Kloimstein, Eferding, Austria, assignors to Osterreichische Steckstoffwerke Aktiengesellschaft, Linz, Austria
No Drawing. Filed Nov. 6, 1962, Ser. No. 235,883
Claims priority, application Austria Nov. 16, 1961
9 Claims. (Cl. 260—250)

This invention relates to novel pyridazine derivatives having a very good choleretic activity. The compounds of the invention are derivatives of 3-halogen-6-mercapto pyridazine, and are completely new choleretically-active compounds.

The invention also relates to a novel process for the preparation of these new 3,6-disubstituted pyridazine derivatives.

The novel 3,6-disubstituted pyridazine derivatives have the general formula:

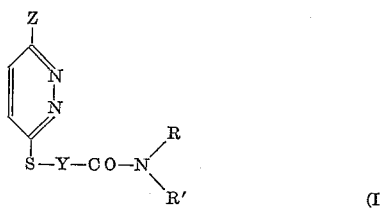

in which Z represents a chlorine or a bromine atom, Y represents a methylene group, an ethylene group or a methylene group substituted by a methyl group, and R and R' each represent a hydrogen atom, an alkyl group having 1 to 4 carbon atoms or an allyl group. Preferred compounds are mono- and di-alkylated amides of 3-chloro-pyridazine-6-mercaptoacetic acid, wherein the alkyl radicals have 1 to 4 carbon atoms.

The novel pyridazine derivatives of Formula I greatly increase the quantity of bile without affecting the secretion which the liver can provide. Also, the novel derivatives are very compatible since they have no unpleasant secondary reactions, for instance, they do not affect blood pressure. The pyridazine derivatives of Formula I can therefore be used in all disorders where increased flow of bile is desirable, as in cholangitis and cholestasis. Preferably, administration is per oral, for instance, in the form of tablets or coated pills or as a syrup.

According to this invention pyridazine derivatives of Formula I can be prepared by reacting a pyridazine derivative having the general formula:

in which Me is an alkali metal ion or the equivalent of an alkaline-earth metal ion and Z is as hereinbefore defined with a chlorocarboxylic acid having the general formula:

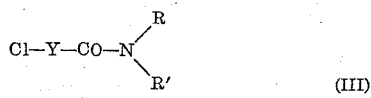

in which Y, R and R' are as defined in Formula I.

The alkali metal salt or alkaline-earth metal salt of the mercapto pyridazine derivative of Formula II need not necessarily be used as such for the reaction according to the invention; and the salt can be prepared equally satisfactorily from the free mercapto pyridazine or the tautomeric thiono compound in the reaction solution. The salt can be formed in situ if an alkali metal hydroxide or alkaline-earth metal hydroxide, alkali metal carbonate or alkaline-earth metal carbonate, in the quantity necessary for the formation of a salt on the SH group, is added to the reaction mixture. Conveniently, the mercapto pyridazine is dissolved in an aqueous solution of the alkali metal or alkaline-earth metal hydroxide or carbonate and, to provide a homogeneous medium, is mixed with a water-miscible organic solvent, such as ethanol, methanol or acetone, before the carboxylic acid amide is added.

In a preferred embodiment of this invention for the preparation of Formula I compounds in which Z represents a chlorine atom, not only is the salt formed in situ but the mercapto group is also introduced into the pyridazine ring in situ. Thus, 3,6-dichloropyridazine is reacted with sodium sulphide and the resultant reaction mixture is reacted with the Formula III chlorocarboxylic acid amide. This variant of the process according to the invention is very simple since it helps to save one complete stage—i.e., preparation of the chloro-mercapto pyridazine.

Pharmacological tests of the Formula I pyridazine derivatives according to the invention show that when given to rats intraduodenally in a 50 mg./kg. dose, the volume of bile was increased by up to 2½ times. The onset of the action is rapid. It was found in other experiments that, with per oral administration, there were no secondary reactions on the central nervous system, blood pressure or liver functions, nor was any analgetic activity noted. These findings could be confirmed in clinical tests made, for instance, with 3-chloro-pyridazine-6-mercaptoacetic acid diethylamide.

The preparation of the pyridazine derivatives which can be prepared in accordance with the invention will be described in greater detail in the following examples; the parts specified therein are parts by weight.

*Example 1*

7.3 parts of 3-chloro-6-mercaptopyridazine are neutralised with 20 parts of 10% caustic soda solution, diluted with 60 parts of 50% alcohol, and heated to 60° C. 7.5 parts of chloroacetic acid diethyl amide dissolved in 20 parts of alcohol are added to this solution over a period of 10 minutes and the resulting mixture is heated to 60° C. for 30 minutes. The reaction solution is then cooled, the resulting crystallisate is removed by suction, and the filtrate is extracted with acetic ester. The same is removed by evaporation and the concentration residue is combined with the crystallisate. After two recrystallisations from benzene, 11 parts of 3-chloro-pyridazine-6-mercapto-acetic acid diethyl amide, having a melting point of from 95° to 97° C. are yielded.

*Example 2*

7 parts of 3-chloro-6-mercapto-pyridazine are dissolved in 19 parts of 10% caustic soda solution and diluted with 30 parts of alcohol. The solution is heated to 60° C. then a solution is added to it of 8.3 parts of chloro-acetic acid diallyl amide in 20 parts of alcohol and the mixture is boiled under reflux for 60 minutes. Upon the termination of the reaction the mixture is mixed with active carbon and filtered, the filtrate is inspissated in vacuo, and the concentration residue is mixed with 100 parts of water. The resulting crystallisate is removed by suction and recrystallised from petroleum ether. 8 parts of 3-chloro-pyridazine - 6 - mercapto-acetic acid-diallyl amide, having a melting point of 56° C. are yielded.

*Example 3*

9.5 parts of 3-bromo-6-mercaptopyridazine are dissolved in 25 parts of 2 N caustic soda solution and heated to boiling. A solution of 6.5 parts of chloro-acetic acid diethylamide, 20 parts of water and 5 parts of alcohol are added, and the resulting mixture is left at 70° C. for 10 minutes. The precipitated oil is crystallised by being allowed to stand for a long time at 0° C. whereafter the crystallisate is removed by suction and recrystallised once from 50% alcohol. 10.8 parts of 3-bromo-pyridazine-6-mercaptoacetic acid diethyl amide, having a melting point of from 87° to 89° C. are yielded.

*Example 4*

14 parts of 3-chloro-6-mercaptopyridazine are dissolved in 50 parts of 2 N caustic soda solution, heated to 70° C. mixed with a mixture of 12 parts of α-chloropropionic acid diethyl amide and 50 parts of alcohol, and heated to 70° C. for 30 minutes. The reaction solution is cooled, an oil separating out which is isolated. This oil is washed several times with a 10% aqueous caustic soda solution, taken up in ether, dried with sodium sulphate, clarified with active carbon and filtered, and the ether is removed by evaporation. The residual oil freezes after standing for a prolonged period. 9 parts of 3-chloro-pyridazine-6-mercapto-α-propionic acid diethyl amide, having a melting point of from 55° to 57° C. are yielded.

*Example 5*

14 parts of 3-chloro-6-mercaptopyridazine are dissolved in 50 parts of 2 N caustic soda solution and heated to boiling point and mixed with a mixture of 12 parts of β-chloropropionic acid diethyl amide containing 25 parts of alcohol. The mixture is heated to from 60° to 70° C. for 20 minutes and then cooled to 0° C. whereafter the oil which has separated out is taken up in ether. After washing twice with 10% caustic soda solution, washing three times in water, clarifying with active carbon and drying on sodium sulphate, the filtrate is inspissated in vacuo and is given three hours high vacuum treatment to remove the solvents. 8 parts of 3-chloropyridazine-6-mercapto-β-propionic acid diethyl amide of an oily consistency are yielded.

*Example 6*

47 parts of sodium sulphide are dissolved in 250 parts of water in an agitating vessel having a powerful agitator and a reflux cooler, heated to 70° C. and mixed with intense agitation with a total of 77 parts of 3,6-dichloropyridazine. The temperature of the reaction mixture rises exothermically to 100° C. in about 10 minutes and the reaction proceeds with intense boiling. The dichloropyridazine present as melt is completely dissolved. After a short time the reaction of dichloropyridazine with sodium sulphide to form chloromercaptopyridazine-sodium is complete. The yellow solution is cooled to 30° C. whereafter 75 parts of chloroacetic acid-diethyl amide are added with vigorous agitation over a period of 5 minutes. The temperature therefore rises automatically to from 55° to 60° C. while the solution is made turbid by separation of the oily 3-chloropyridazine-6-mercapto-acetic acid diethylamide. Reaction is continued for a further 15 minutes whereafter the mixture is cooled to 5° C. The oil is therefore frozen into small light-yellow lumps. These are removed by suction, dissolved in 200 parts of benzene, dried on sodium sulphate, agitated with 5 parts of active carbon for 30 minutes and then filtered. The benzene solution is concentrated to about 200 parts, mixed with 40 parts of ether and left to crystallise. The crystallisate is removed by suction, washed twice with 15 parts of ether, and dried in vacuo. 75 parts of 3-chloropyridazine-6-mercaptoacetic-acid-diethyl amide having a melting point of from 95.5° to 96.5° C. are yielded. A further 27 parts of pure substance can be obtained by further working-up of the mother liquor.

*Example 7*

14.6 parts of 3-chloro-6-mercaptopyridazine are neutralised with 15 parts of 2 N caustic soda solution, diluted with 20 parts of alcohol and heated to boiling. This solution has added to it a mixture of 13.6 parts of chloroacetic-acid-di-n-propylamide and 30 parts of alcohol, and the whole is boiled for a short time. The reaction mixture is cooled to 0° C. and the resulting crystallisate is removed by suction and recrystallised twice from petroleum ether. 9.6 parts of 3-chloro-pyridazine-6-mercaptoacetic acid-di-n-propylamide having a melting point of from 55° to 56° C. are yielded.

The following compounds are prepared similarly:
3-chloro-pyridazine-6-mercaptoacetic acid amide having a melting point of 180° to 183° C.
3-chloro-pyridazine - 6 - mercaptoacetic acid methyl amide having a melting point of 148° to 150° C.
3-chloro-pyridazine-6-mercaptoacetic acid ethyl amide having a melting point of 153° to 154° C.
3-chloro-pyridazine - 6 - mercaptoacetic acid dimethyl amide having a melting point of 139° to 140° C.
3-chloro-pyridazine-6-mercaptoacetic acid - diisopropyl-amide having a melting point of 91° to 92° C.
3 - chloro-pyridazine-6-mercaptoacetic acid-di-n-butyl amide as an oil.

We claim:
1. A 3,6-disubstituted pyridazine derivative having the formula:

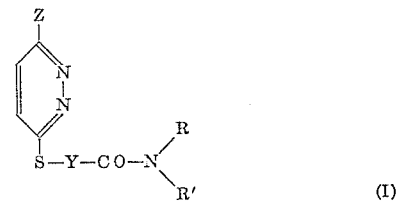

in which Z is a halogen atom selected from the group consisting of chlorine and bromine, Y is a divalent radical selected from the group consisting of methylene, ethylene and methylene substituted by a methyl group, and R and R' are each selected from the group consisting of hydrogen, lower alkyl containing from 1 to 4 carbon atoms inclusive and allyl.

2. A 3-chloro-6-mercapto pyridazine derivative having the formula:

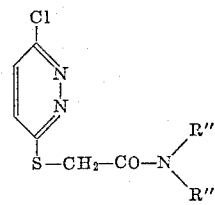

in which R″ represents an alkyl group having 1 to 4 carbon atoms.

3. A 3-chloro-6-mercapto pyridazine derivative having the formula:

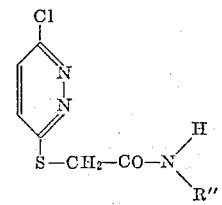

in which R″ represents an alkyl group having 1 to 4 carbon atoms.

4. 3 - chloropyridazine-6-mercaptoacetic acid-diethylamide.

5. 3-chloropyridazine-6-mercaptoacetic acid-di-n-propylamide.

6. 3-chloropyridazine-6-mercaptoacetic acid diallylamide.

7. 3-chloropyridazine-6-mercaptoacetic acid-ethylamide.

8. 3-chloropyridazine-6-mercapto-α-propionic acid-diethylamide.

9. 3-bromopyridazine-6-mercaptoacetic acid-diethylamide.

References Cited in the file of this patent

FOREIGN PATENTS

| | | |
|---|---|---|
| 1,098,000 | Germany | Jan. 26, 1961 |
| 1,099,544 | Germany | Feb. 16, 1961 |

OTHER REFERENCES

Shriner et al.: Identification of Organic Compounds, 35d Edition, 1948, pp. 155–158.